(12) United States Patent
Wang et al.

(10) Patent No.: US 11,181,203 B1
(45) Date of Patent: Nov. 23, 2021

(54) PORTABLE WATER PATH SWITCHING DEVICE

(71) Applicant: XIAMEN KEEKOE SANITARY WARE CO., LTD, Xiamen (CN)

(72) Inventors: Qiu Wang, Xiamen (CN); Chao Wang, Xiamen (CN)

(73) Assignee: XIAMEN KEEKOE SANITARY WARE CO., LTD, Xiamen (CN)

( * ) Notice: Subject to any disclaimer, the term of this patent is extended or adjusted under 35 U.S.C. 154(b) by 0 days.

(21) Appl. No.: 17/031,824

(22) Filed: Sep. 24, 2020

(30) Foreign Application Priority Data

Aug. 4, 2020  (CN) .......................... 202021590772.2

(51) Int. Cl.
*F16K 11/074* (2006.01)
*B05B 1/16* (2006.01)

(52) U.S. Cl.
CPC .......... *F16K 11/0743* (2013.01); *B05B 1/1609* (2013.01); *Y10T 137/86863* (2015.04)

(58) Field of Classification Search
CPC ..... Y10T 137/86863; Y10T 137/86501; Y10T 137/86533; F16K 11/072
USPC ....................................................... 239/443
See application file for complete search history.

(56) References Cited

U.S. PATENT DOCUMENTS

| | | | | |
|---|---|---|---|---|
| 2,075,458 A * | 3/1937 | Parker | ....................... | F16K 3/08 137/625.11 |
| 3,116,757 A * | 1/1964 | Donguy | ................. | G21C 17/04 137/625.11 |
| 3,802,563 A * | 4/1974 | Sasaki | ................... | F16K 11/056 210/120 |
| 4,907,744 A * | 3/1990 | Jousson | ............. | A61C 17/0202 137/625.44 |
| 7,509,976 B2 * | 3/2009 | McNerney | .......... | F16K 11/0743 137/625.11 |
| 9,803,759 B2 * | 10/2017 | Bachofer | ............... | F16K 27/045 |
| 2002/0179164 A1 * | 12/2002 | Hashimoto | ....... | F16K 31/52416 137/870 |
| 2004/0050432 A1 * | 3/2004 | Breda | ................. | F16K 11/0856 137/625.11 |
| 2006/0207664 A1 * | 9/2006 | Yang | ..................... | F16K 11/074 137/597 |
| 2008/0190501 A1 * | 8/2008 | Yang | ................... | F16K 11/0743 137/625.47 |
| 2011/0192915 A1 * | 8/2011 | Li | ......................... | B05B 1/1609 239/394 |

(Continued)

*Primary Examiner* — Robert K Arundale
(74) *Attorney, Agent, or Firm* — JCIP Global Inc.

(57) ABSTRACT

A portable water path switching device includes a valve body, a water diversion member, and a switching assembly. The valve body is provided with a valve cavity, a water inlet communicating with the valve cavity, and at least two water outlets. The water diversion member is arranged in the valve cavity and at least provided with first water diversion holes and second water diversion holes. The first water diversion holes communicate with the first water outlet, and the second water diversion holes communicate with the second water outlet. The switching assembly is movably connected to the valve body and includes seal balls. When the switching assembly is driven, the seal balls switchably block the first water diversion holes and the second water diversion holes, so that water flow of the water inlet switchably flows to the second water outlet and the first water outlet.

11 Claims, 7 Drawing Sheets

(56) References Cited

U.S. PATENT DOCUMENTS

| | | | |
|---|---|---|---|
| 2012/0048968 A1* | 3/2012 | Williams | E03C 1/0409 239/443 |
| 2012/0145810 A1* | 6/2012 | Zhou | B05B 1/18 239/443 |
| 2012/0204979 A1* | 8/2012 | Pan | F16K 27/045 137/554 |
| 2012/0318391 A1* | 12/2012 | Zhou | B05B 1/1636 137/625.46 |
| 2013/0118620 A1* | 5/2013 | Zhou | B05B 1/18 137/625.46 |
| 2013/0168473 A1* | 7/2013 | Langkamp | B05B 1/1609 239/562 |
| 2014/0102574 A1* | 4/2014 | Wang | F16K 11/074 137/862 |
| 2016/0061346 A1* | 3/2016 | Sato | B05B 1/1627 239/562 |

\* cited by examiner

PORTABLE WATER PATH SWITCHING DEVICE

CROSS-REFERENCE TO RELATED APPLICATION

This application claims the priority benefit of China application serial no. 202021590772.2, filed on Aug. 4, 2020. The entirety of the above-mentioned patent application is hereby incorporated by reference herein and made a part of this specification.

BACKGROUND

Technical Field

The present application relates to a water path switching device, in particular to a portable water path switching device.

Description of Related Art

Shower systems in bathrooms are generally provided with various water outlet devices, such as handheld shower heads, overhead shower heads and spray guns. In order to enable water flow to be freely switched between the various water outlet devices, a water path switching device is usually arranged for water path switching control. A control valve core of an existing water path switching device usually adopts a sealing gasket or a sealing ring to seal and isolate water diversion holes in a water distribution structure, while the water path switching device needs to overcome friction force generated by the sealing gasket or the sealing ring during the switching process, then the driving force value for driving the water path switching device is large, which in turn leads to laborious switching and poor operation experience.

SUMMARY

In order to solve the above-mentioned problems, the present application provides a portable water path switching device, the water path switching device can be switched and controlled more easily, and operation experience is better.

To achieve the above objectives, the present application provides the following technical solutions.

A portable water path switching device includes a valve body, a water diversion member and a switching assembly. The valve body is provided with a valve cavity, a water inlet communicating with the valve cavity, and at least two water outlets. The water outlets include a first water outlet and a second water outlet. The water diversion member is arranged in the valve cavity and is at least provided with first water diversion holes and second water diversion holes. The first water diversion holes communicate with the first water outlet, and the second water diversion holes communicate with the second water outlet. The switching assembly is movably connected to the valve body. The switching assembly includes seal balls, and when the switching assembly is driven, the seal balls switchably block the first water diversion holes and the second water diversion holes, so that water flow of the water inlet switchably flows to the second water outlet and the first water outlet.

In an optional or preferred embodiment, a water inlet cavity is formed in the valve cavity, and the water inlet, the first water diversion holes and the second water diversion holes all communicate with the water inlet cavity. A first water outlet channel and a second water outlet channel are further formed in the valve cavity. Sides, away from the water inlet cavity, of the first water diversion holes communicate with the first water outlet through the first water outlet channel, and sides, away from the water inlet cavity, of the second water diversion holes communicate with the second water outlet through the second water outlet channel.

In an optional or preferred embodiment, the seal balls are rollably arranged in the water inlet cavity.

In an optional or preferred embodiment, the switching assembly further includes a ball seat movably connected into the valve body, the seal balls are rollably arranged on the ball seat, and the seal balls are driven to move relative to the water diversion member by driving the ball seat.

In an optional or preferred embodiment, ball cavities are formed on the ball seat, and the seal balls are arranged in the ball cavities and partially extend out of the ball cavities. The switching assembly further includes elastic members, the elastic members are elastically abutted between the seal balls and cavity walls of the ball cavities, and the elastic members apply elastic force to the seal balls in the direction where the first water diversion holes or the second water diversion holes are sealed.

In an optional or preferred embodiment, the switching assembly further includes a trigger or a knob, and the trigger or the knob is rotationally connected to the valve body and is in linkage cooperation with the ball seat.

In an optional or preferred embodiment, a number of the first water diversion holes is two, a number of the second water diversion holes is two, correspondingly, a number of the seal balls is two, the first water diversion holes and the second water diversion holes are alternately arranged at intervals in the circumferential direction, and the two seal balls simultaneously block the two first water diversion holes or simultaneously block the two second water diversion holes.

In an optional or preferred embodiment, the diameters of the two seal balls are different.

In an optional or preferred embodiment, the portable water path switching device further includes a grade prompt structure, the grade prompt structure includes a spring pin assembly and a plurality of grade holes, and when the switching assembly moves relative to the valve body, the spring pin assembly is switchably matched with the grade holes.

In an optional or preferred embodiment, the water path switching device further includes a hollow housing with two open ends, the valve body is arranged in the housing and fixedly arranged relative to the housing, a water inlet connector, a first water outlet connector and a second water outlet connector extend outwards from the side wall of the housing, the water inlet connector communicates with the water inlet of the valve body, the first water outlet connector communicates with the first water outlet of the valve body, and the second water outlet connector communicates with the second water outlet of the valve body. The switching assembly further includes a trigger or a knob, and the trigger or the knob is connected to and covers the first open end of the housing.

In an optional or preferred embodiment, the first water outlet connector communicates with a handheld shower head, and the second water outlet connector communicates with an overhead shower head or a spray gun. The portable water path switching device further includes an insertion base for inserting and holding the handheld shower head, and the insertion base is connected to and covers the second open end of the housing and is fixedly connected to the valve body.

Compared with the prior art, the present application has the advantages as follows.

1. By arranging the switching assembly with the seal balls, the seal balls are used to switchably block the first water diversion holes and the second water diversion holes, so that water flow of the water inlet switchably flows to the first water outlet and the second water outlet, and the switching structure is simple. In addition, the rolling friction force of the seal balls during the movement process is small, thus, the driving force for driving the switching assembly is greatly reduced, and then the water path switching operation is easier, and operation experience is better.

2. By arranging the ball seat, the seal balls are arranged on the ball seat, the seal balls are driven by driving the ball seat, and therefore the purpose of controlling the seal balls more reliably can be achieved.

3. By arranging the elastic members, elastic members apply a certain elastic force to the seal balls, thus the seal balls are assisted in sealing the water diversion holes more effectively, and the sealing effect is more reliable.

4. The diameters of the two seal balls are set to be different, which has the advantage that during the switching process, the ball seat firstly pushes the seal ball with a larger diameter and then pushes the seal ball with a smaller diameter instead of pushing the two balls simultaneously, effort can further be saved, switching is smoother, and the experience of the switching operation is further improved.

5. The switching operation is more visual by arranging the grade prompt structure.

BRIEF DESCRIPTION OF THE DRAWINGS

In order to make the advantages of the present application easier to understand, the present application briefly described above is described in more detail with reference to specific embodiments shown in the accompanying drawings. It should be understood that these accompanying drawings only depict typical embodiments of the present application, and therefore should not be considered as limiting the scope of protection thereof. The present application is described and explained with additional features and details through the accompanying drawings. In the accompanying drawings.

DESCRIPTION OF THE EMBODIMENTS

In order to make the technical problems to be solved by the present application, technical solutions and beneficial effects clearer, the present application is described in detail with reference to the accompanying drawings and embodiments below. It should be understood that the specific embodiments described herein are only used to explain the present application, but not to limit the present application.

In the following discussion, details are given in order to provide a more thorough understanding of the present application. However, those skilled in the art can understand that the present application can be implemented without one or more of these details. In certain examples, in order to avoid confusion with the present application, some technical features known in the art are not described in detail. It should be noted that the terms "upper", "lower", "front", "rear", "left", "right" and similar expressions used herein are for illustrative purposes only instead of limiting.

The ordinal words such as "first" and "second" cited in the present application are merely identifications, and do not have any other meanings such as a specific order. Also, for example, the term "first component" does not imply the existence of "second component", and the term "second component" does not imply the existence of "first component".

Referring to FIGS. 1 to 6, a portable water path switching device according to a preferred embodiment of the present application is used for switching water paths so as to control the flow direction of water flow. The water path switching device includes a valve body 10, a water diversion member 20 and a switching assembly 30.

The valve body 10 is provided with a valve cavity, a water inlet 11 communicating with the valve cavity, and at least two water outlets 12. The water outlets 12 include a first water outlet 121 and a second water outlet 122. The valve body 10 includes a lower valve body 10a and an upper valve body 10b. The lower valve body 10a and the upper valve body 10b are fastened up and down to form the valve cavity.

Figure 2:
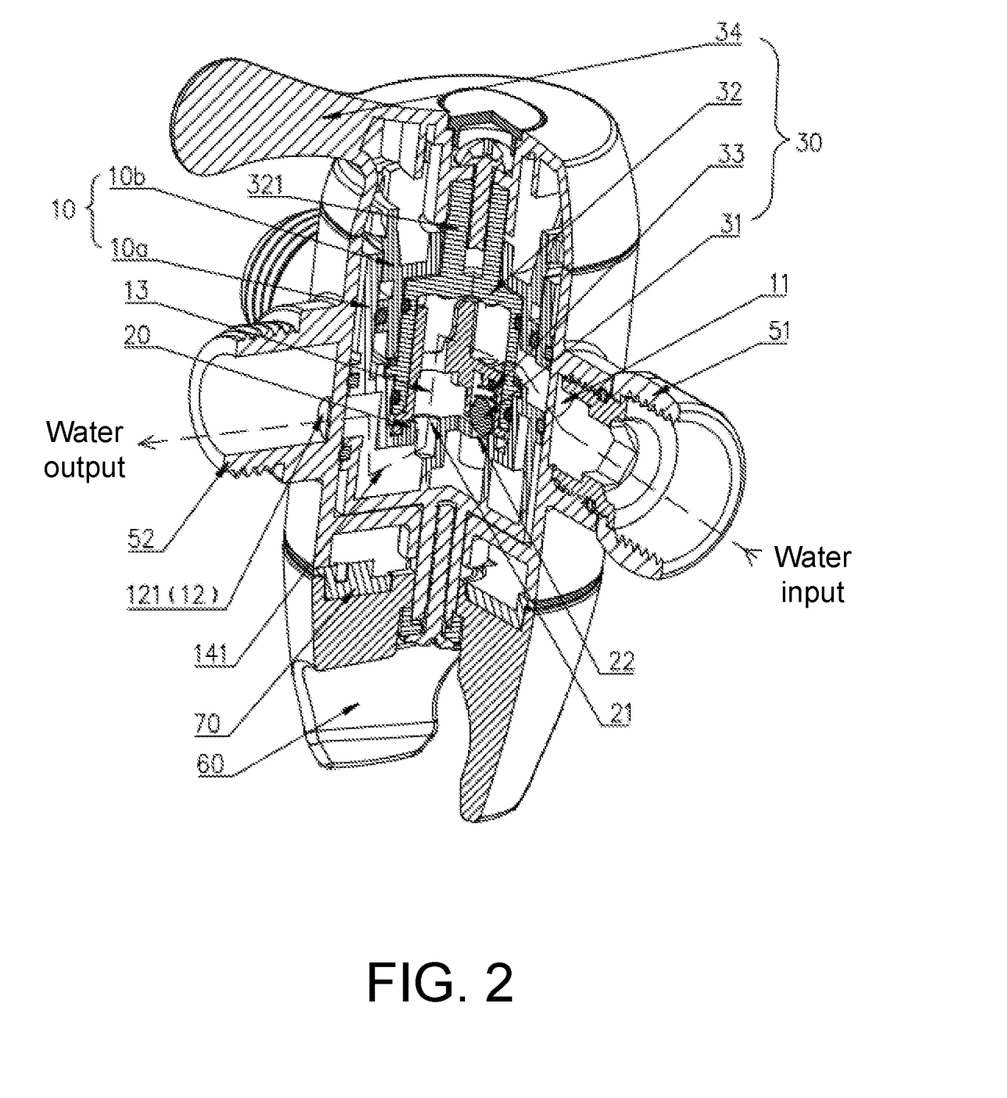
FIG. 2 is a three-dimensional cross-sectional view of a water path switching device according to an embodiment of the present application.
Figure 3:
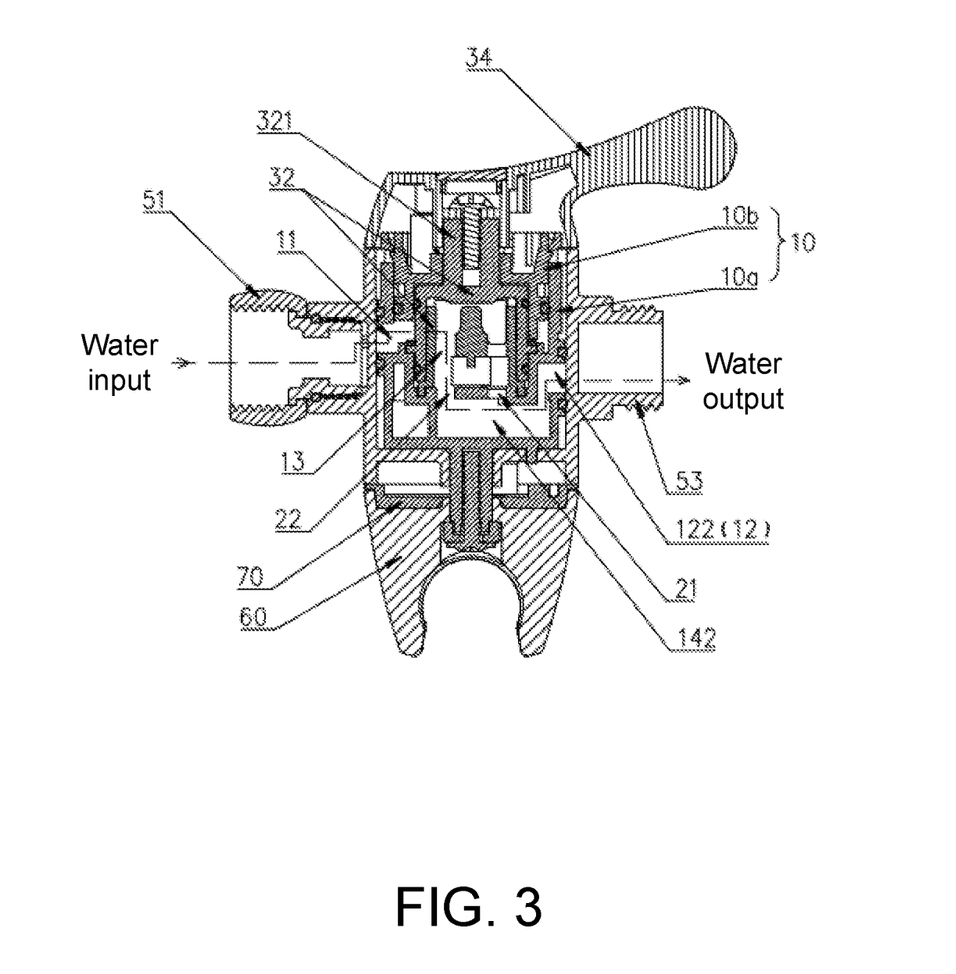
FIG. 3 is a cross-sectional view of a water path switching device according to an embodiment of the present application.
Figure 4:
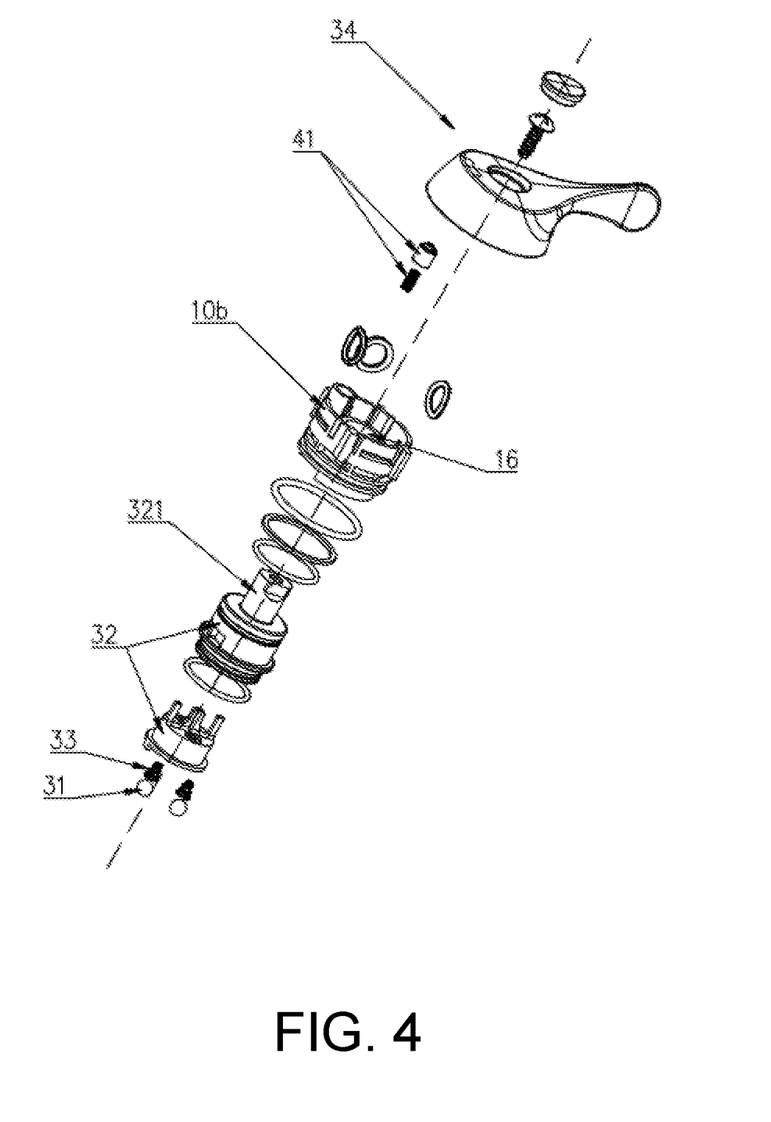
FIG. 4 is a first partial three-dimensional exploded view of an embodiment of the present application.
Figure 6:
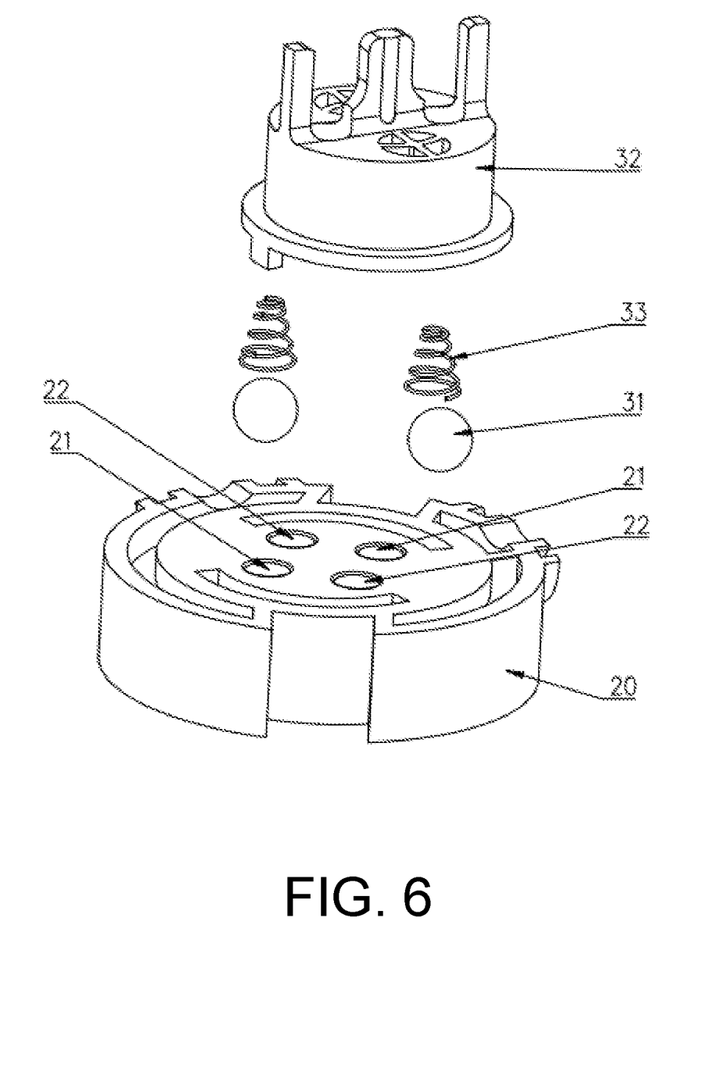
FIG. 6 is a third partial three-dimensional exploded view of an embodiment of the present application.

Referring to FIG. 2, FIG. 3 and FIG. 6, the water diversion member 20 is arranged in the valve cavity, and the water diversion member 20 is at least provided with first water diversion holes 21 and second water diversion holes 22. The embodiment takes two water outlets 12 as an example for detailed description, and the two water outlets 12 correspond to the two water diversion holes, respectively. Specifically, the first water diversion holes 21 communicate with the first water outlet 121, and the second water diversion holes 22 communicate with the second water outlet 122. In the embodiment, the water diversion member 20 and the lower valve body 10a are integrally formed, certainly, the water diversion member 20 and the lower valve body 10a may also be formed separately, and then the water diversion member 20 is fixed in the valve cavity of the valve body 10.

Referring to FIGS. 2, 4, 5 and 6, the switching assembly 30 is movably connected to the valve body 10, and the switching assembly 30 includes seal balls 31, a ball seat 32, elastic members 33 and a trigger 34. The ball seat 32 is movably connected into the valve body 10, and the lower valve body 10a and the upper valve body 10b are fastened up and down to confine the ball seat 32 in the valve body 10. A connecting shaft 321 is arranged on the ball seat 32, and the connecting shaft 321 extends from a receding hole 16 formed in the upper valve body 10b and is fixedly connected to the trigger 34. The seal balls 31 are rollably arranged in ball cavities formed in the ball seat 32, and the seal balls 31 are driven to move relative to the water diversion member 20 by driving the ball seat 32. The seal balls 31 are arranged in the ball cavities and partially extend out of the ball cavities. The elastic members 33 are elastically abutted between the seal balls 31 and cavity walls of the ball cavities, compression springs are adopted as the elastic members 33, the elastic members 33 apply elastic force to the seal balls 31 in the direction where the first water diversion holes 21 or the second water diversion holes 22 are sealed, and thus the seal balls 31 can seal the first water diversion holes 21 or the second water diversion holes 22 more reliably. The trigger 34 is rotationally connected to the valve body 10 and is in linkage cooperation with the ball seat 32. The linkage cooperation between the trigger 34 and the ball seat 32 is achieved by fixedly connecting the trigger 34 to the ball seat 32 through screws.

When the trigger 34 of the switching assembly 30 is driven, the trigger 34 drives the ball seat 32 to rotate relative to the valve body 10, and the ball seat 32 in turn drives the seal balls 31 to move relative to the water diversion member 20, so that the seal balls 31 switchably block the first water diversion holes 21 and the second water diversion holes 22, and then water flow of the water inlet 11 switchably flows to the first water outlet 121 and the second water outlet 122. It is understandable that the trigger 34 may also be replaced with a knob, and similarly, the knob is rotationally connected to the valve body 10 and is in linkage cooperation with the ball seat 32.

Referring to FIGS. 2 and 3, in the embodiment, a water inlet cavity 13 is formed in the valve cavity of the valve body 10, and the water inlet 11, the first water diversion holes 21 and the second water diversion holes 22 all communicate with the water inlet cavity 13. The seal balls 31 are rollably arranged in the water inlet cavity 13. A first water outlet channel 141 and a second water outlet channel 142 are further formed in the valve cavity. The sides, away from the water inlet cavity 13, of the first water diversion holes 21 communicate with the first water outlet 121 through the first water outlet channel 141, and the sides, away from the water inlet cavity 13, of the second water diversion holes 22 communicate with the second water outlet 122 through the second water outlet channel 142.

Referring to FIG. 6, specifically, in order to make water flow larger, the number of the first water diversion holes 21 is two, and the number of the second water diversion holes 22 is two. Correspondingly, the number of the seal balls 31 is two. The first water diversion holes 21 and the second water diversion holes 22 are alternately arranged at equal intervals in the circumferential direction. When the ball seat 32 drives the seal balls 31 to move, the two seal balls 31 can simultaneously block the two first water diversion holes 21 or simultaneously block the two second water diversion holes 22. In the embodiment, the diameters of the two seal balls 31 are the same.

Figure 5:
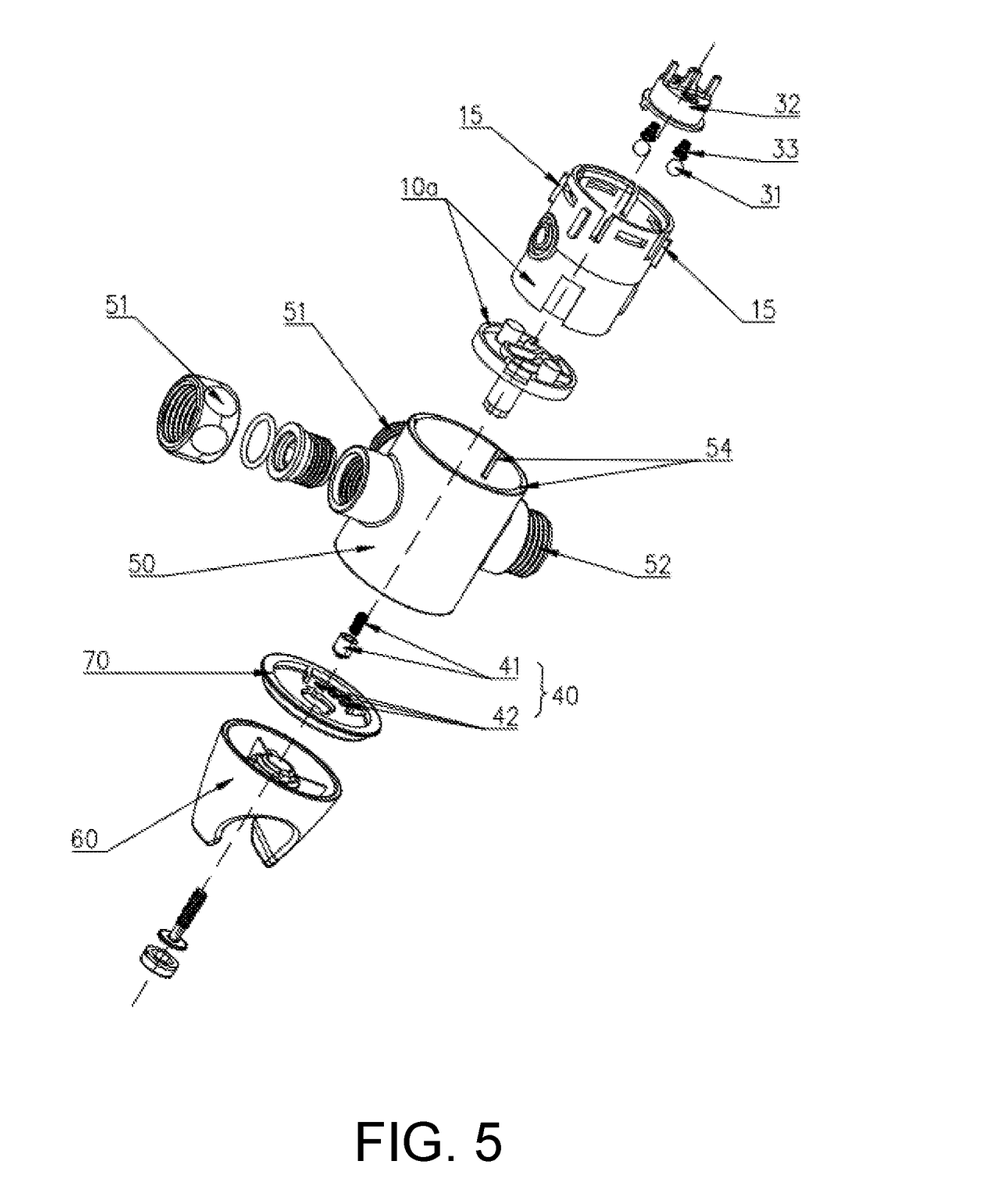
FIG. 5 is a second partial three-dimensional exploded view of an embodiment of the present application.

Referring to FIG. 5, in order to make the switching process more visual, the water path switching device of the embodiment further includes a grade prompt structure 40 for prompting switched grades. The grade prompt structure 40 includes a spring pin assembly 41 and a plurality of grade holes 42. The spring pin assembly 41 includes a spring and a pin. When the switching assembly 30 moves relative to the valve body 10, the spring pin assembly 41 is switchably matched with the grade holes 42. Specifically, in the embodiment, two sets of grade prompt structures 40 are arranged, the spring pin assembly 41 of one set of the grade prompt structure 40 moves with the ball seat 32 of the switching assembly 30, and the grade holes 42 are formed in a pressure plate 70, the pressure plate 70 is clamped between an insertion base 60 described below and the valve body 10, and the pressure plate 70 is fixed relative to the valve body 10. The spring pin assembly 41 of the other set of the grade prompt structure 40 is arranged on the valve body 10, and the grade holes 42 are formed in the trigger 34 so as to rotate with the trigger 34.

Figure 1:
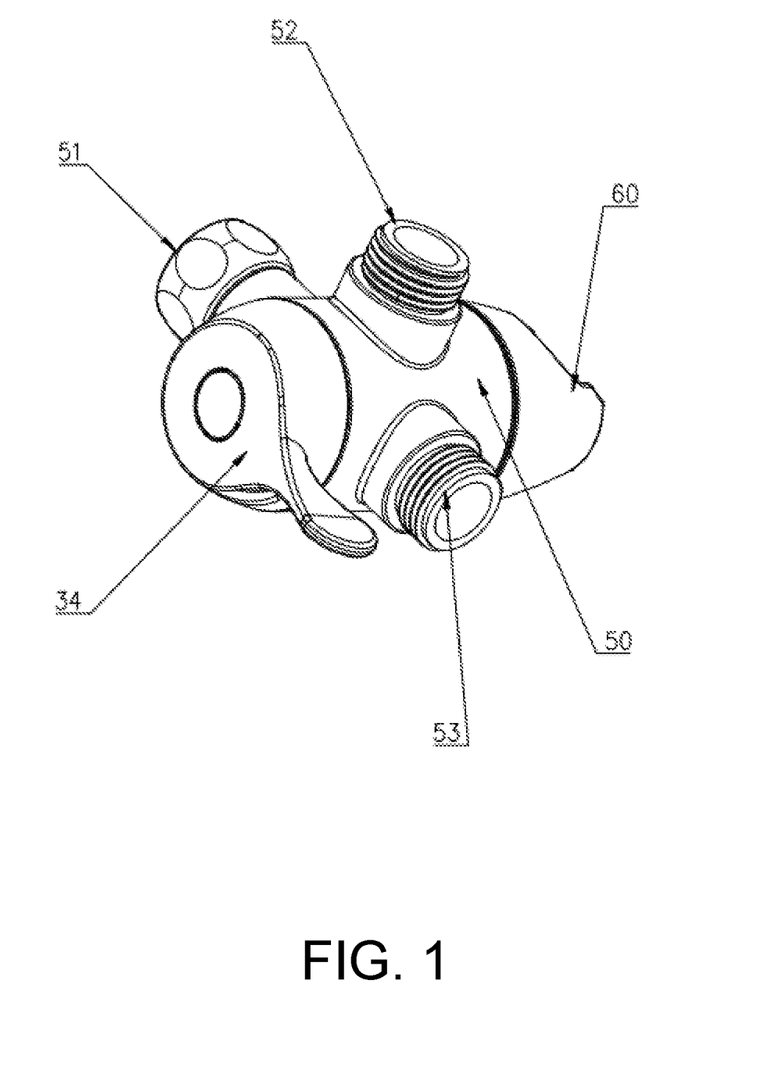
FIG. 1 is an assembled three-dimensional structure diagram of a water path switching device according to an embodiment of the present application.

Referring to FIG. 1, FIG. 2 and FIG. 5. In order to make the appearance of the water path switching device more concise and compact, the water path switching device further includes a hollow housing 50 with two open ends. The valve body 10 is arranged in the housing 50 and fixedly arranged relative to the housing 50 in the circumferential direction. Specifically, ribs 15 are arranged on the outer wall of the valve body 10, and clamping slots 54 are formed in the inner wall of the housing 50, and through cooperation of the ribs 15 and the clamping slots 54, the valve body 10 and the housing 50 are relatively fixed in the circumferential direction. A water inlet connector 51, a first water outlet connector 52 and a second water outlet connector 53 extend outwards from the side wall of the housing 50. The water inlet connector 51 communicates with the water inlet 11 of the valve body 10, the first water outlet connector 52 communicates with the first water outlet 121 of the valve body 10, and the second water outlet connector 53 communicates with the second water outlet 122 of the valve body 10. The trigger 34 is connected to and covers the first open end of the housing and is fixedly connected to the ball seat 32.

In the embodiment, the water path switching device is used for switching water flow of water outlet devices such as a shower head of a shower system. Specifically, the first water outlet connector 52 is connected to a handheld shower head, and the second water outlet connector 53 is connected to an overhead shower head or a spray gun. The water path switching device further includes an insertion base 60 for inserting and holding a handheld shower head, and the insertion base 60 is connected to and covers the second open end of the housing and is fixedly connected to the valve body 10. It is understandable that the water path switching device of the present application can be used for water path switching of other water path systems, such as kitchen water outlet devices, in addition to water path switching of the water outlet devices (shower heads) of shower systems.

During usage, by shifting the trigger 34, the trigger 34 drives the ball seat 32 to rotate relative to the valve body 10, the ball seat 32 then drives the seal balls 31 to move between the first water diversion holes 21 and the second water diversion holes 22, and thus the seal balls 31 switchably seal and block the first water diversion holes 21 or the second water diversion holes 22. As shown in FIG. 2, when the seal balls 31 block the second water diversion holes 22, water entering the water inlet cavity from the water inlet 11 flows from the first water diversion holes 21 to the first water outlet channel 141, and flows to the first water outlet 121 through the first water outlet channel 141, so that the water inlet 11 communicates with the first water outlet 121. As shown in FIG. 3, when the seal balls 31 block the first water diversion holes 21, water entering the water inlet cavity from the water inlet 11 flows from the second water diversion holes 22 to the second water outlet channel 142, and flows to the second water outlet 122 through the second water outlet channel 142, so that the water inlet 11 communicates with the second water outlet 122. Thus, the water path switching operation is achieved.

Figure 7:
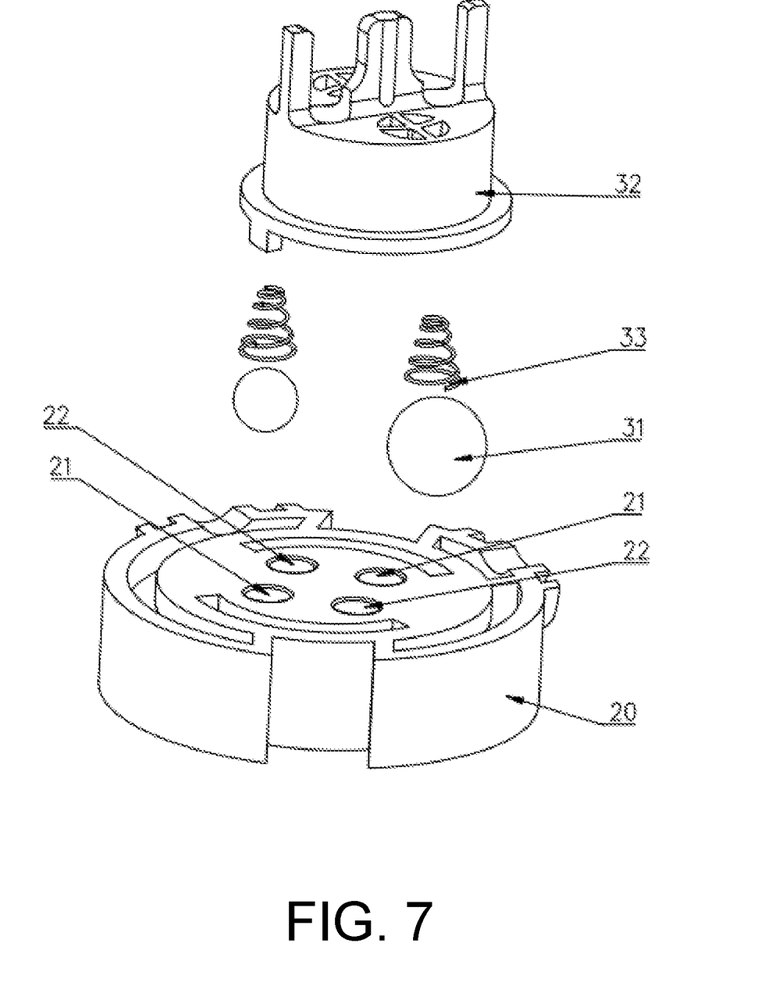
FIG. 7 is a partial three-dimensional exploded view of another embodiment of the present application.

Referring to FIG. 7, a portable water path switching device according to another preferred embodiment of the present application is different from the foregoing embodiment in that the diameters of two seal balls 31 are different. The advantage of this arrangement is that during the switching process, a ball seat 32 firstly pushes the seal ball 31 with a larger diameter, and then pushes the seal ball 31 with a smaller diameter, instead of pushing the two balls simultaneously, thus effort can further be saved, and switching is smoother, so that the experience of the switching operation is further improved. The rest of the structure of the embodiment is the same as the above embodiment, and is not described in detail herein.

Unless otherwise defined, the technical and scientific terms used herein have the same meanings as commonly understood by those skilled in the art of the present application. The terms used herein are only for describing specific implementation purposes, and are not intended to limit the present application. The terms such as "component" appearing herein may mean a single part or a combination of multiple parts. Terms such as "installation" and "arrangement" appearing herein may either mean that one component is directly attached to another component, or that one component is attached to another component through an intermediate part. Features described in one embodiment herein may be applied to another embodiment alone or in combination with other features, unless the features are not applicable to the other embodiments or otherwise stated.

The above description shows and describes the preferred embodiments of the present application. As mentioned above, it should be understood that the present application is not limited to the forms disclosed herein, and should not be regarded as an exclusion of other embodiments, but can be used in various other combinations, modifications and environments, and can be modified through the above teachings or technologies or knowledge in related fields within the scope of the inventive concept herein. The modifications and variations made by those skilled in the art without departing from the spirit and scope of the present application should fall within the protection scope of the appended claims of the present application.

What is claimed is:

1. A portable water path switching device, comprising:
   a valve body, provided with a valve cavity, a water inlet communicating with the valve cavity, and at least two water outlets, wherein the water outlets comprise a first water outlet and a second water outlet;
   a water diversion member, arranged in the valve cavity and at least provided with first water diversion holes and second water diversion holes, wherein the first water diversion holes communicate with the first water outlet, and the second water diversion holes communicate with the second water outlet; and
   a switching assembly, movably connected to the valve body, wherein the switching assembly comprises seal balls, and when the switching assembly is driven, the seal balls switchably block the first water diversion holes and the second water diversion holes, so that water flow of the water inlet switchably flows to the second water outlet and the first water outlet.

2. The portable water path switching device according to claim 1, wherein a water inlet cavity is formed in the valve cavity, and the water inlet, the first water diversion holes and the second water diversion holes all communicate with the water inlet cavity; and a first water outlet channel and a second water outlet channel are further formed in the valve cavity, sides, away from the water inlet cavity, of the first water diversion holes communicate with the first water outlet through the first water outlet channel, and sides, away from the water inlet cavity, of the second water diversion holes communicate with the second water outlet through the second water outlet channel.

3. The portable water path switching device according to claim 2, wherein the seal balls are rollably arranged in the water inlet cavity.

4. The portable water path switching device according to claim 1, wherein the switching assembly further comprises a ball seat movably connected into the valve body, the seal balls are rollably arranged on the ball seat, and the seal balls are driven to move relative to the water diversion member by driving the ball seat.

5. The portable water path switching device according to claim 4, wherein ball cavities are formed on the ball seat, and the seal balls are arranged in the ball cavities and partially extend out of the ball cavities; and the switching assembly further comprises elastic members, the elastic members are elastically abutted between the seal balls and cavity walls of the ball cavities, and the elastic members apply elastic force to the seal balls in a direction where the first water diversion holes or the second water diversion holes are sealed.

6. The portable water path switching device according to claim 4, wherein the switching assembly further comprises a trigger or a knob, and the trigger or the knob is rotationally connected to the valve body and is in linkage cooperation with the ball seat.

7. The portable water path switching device according to claim 1, wherein a number of the first water diversion holes is two, a number of the second water diversion holes is two, a number of the seal balls is two, the first water diversion holes and the second water diversion holes are alternately arranged at intervals in a circumferential direction, and the two seal balls simultaneously block the two first water diversion holes or simultaneously block the two second water diversion holes.

8. The portable water path switching device according to claim 6, wherein diameters of the two seal balls are different.

9. The portable water path switching device according to claim 1, further comprising a grade prompt structure, wherein the grade prompt structure comprises a spring pin assembly and a plurality of grade holes, and when the switching assembly moves relative to the valve body, the spring pin assembly is switchably matched with the grade holes.

10. The portable water path switching device according to claim 1, further comprising a hollow housing with two open ends, wherein the valve body is arranged in the housing and fixedly arranged relative to the housing, a water inlet connector, a first water outlet connector and a second water outlet connector extend outwards from a side wall of the housing, the water inlet connector communicates with the water inlet of the valve body, the first water outlet connector communicates with the first water outlet of the valve body, and the second water outlet connector communicates with the second water outlet of the valve body; and the switching assembly further comprises a trigger or a knob, and the trigger or the knob is connected to and covers a first open end of the housing.

11. The portable water path switching device according to claim 10, wherein the first water outlet connector communicates with a handheld shower head, and the second water outlet connector communicates with an overhead shower head or a spray gun; and the portable water path switching device further comprises an insertion base for inserting and holding the handheld shower head, and the insertion base is connected to and covers a second open end of the housing and is fixedly connected to the valve body.

* * * * *